United States Patent
Masada et al.

(10) Patent No.: US 7,314,666 B2
(45) Date of Patent: Jan. 1, 2008

(54) IRON NITRIDE SYSTEM MAGNETIC POWDER HAVING GOOD STORAGE STABILITY

(75) Inventors: Kenji Masada, Okayama (JP); Hiroshi Kimura, Okayama (JP); Takafumi Amino, Okayama (JP)

(73) Assignee: Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 11/311,281

(22) Filed: Dec. 20, 2005

(65) Prior Publication Data

US 2006/0131537 A1  Jun. 22, 2006

(30) Foreign Application Priority Data

Dec. 21, 2004  (JP) .............................. 2004-369173

(51) Int. Cl.
*B32B 5/66* (2006.01)
(52) U.S. Cl. ...................... 428/402; 428/403; 428/323; 428/694 BA
(58) Field of Classification Search ................ 428/402, 428/403, 323, 694 BA
See application file for complete search history.

(56) References Cited

U.S. PATENT DOCUMENTS 5,605,752 A * 2/1997 Matsubayashi ............. 428/323

FOREIGN PATENT DOCUMENTS

JP    2000-277311    10/2000
WO   WO 03/079333    9/2003

* cited by examiner

*Primary Examiner*—Leszek Kiliman
(74) *Attorney, Agent, or Firm*—Clark & Brody

(57) ABSTRACT

An iron nitride system magnetic powder comprising of particles comprised primarily of $Fe_{16}N_2$ (having an average particle diameter of up to 25 nm, for example) is provided, to which one or more elements selected from Si, P and Ti is adhered. The powder has a C/Fe atomic ratio of 0.5 to 30%, preferably a (Si+P+Ti)/Fe atomic ratio of 0.1 to 10%. With $\Delta Hc$ defined $(Hc_0 \cdot Hc_1)/Hc_0 \times 100$, the powder has a $\Delta Hc$ of up to 5%, and with $\Delta\sigma s$ defined as $(\sigma s_0 \cdot \sigma s_1)/\sigma s_0 \times 100$, a $\Delta\sigma s$ of up to 20%. The powder can provide an ignition temperature of 140° C. or above, and a tap density of 1.0 g/cm³ or above. $Hc_0$ and $\sigma s_0$ are the coercive force (kA/m) and saturation magnetization ($Am^2/kg$), respectively, of the iron nitride system magnetic powder after adhesion, and $Hc_1$ and $\sigma s_1$ are the coercive force (kA/m) and saturation magnetization ($Am^2/kg$), respectively, of the powder after it has been stored in a thermo-hygrostat for one week at a temperature of 60° C. and a relative humidity of 90%.

10 Claims, No Drawings

IRON NITRIDE SYSTEM MAGNETIC POWDER HAVING GOOD STORAGE STABILITY

FIELD OF THE INVENTION

The present invention relates to an iron nitride system magnetic powder for use in a high recording density magnetic recording medium, particularly to a powder having improved magnetic aging properties and, with a high ignition temperature, good storage stability.

DESCRIPTION OF THE PRIOR ART

In order to achieve the increasingly higher recording densities required by today's magnetic recording media, recording wavelengths are being shortened. To accomplish this, however, the size of the magnetic particles has to be much smaller than the length of the region used to record the short-wavelength signal, otherwise a distinct magnetic transition cannot be produced, which, in practical terms, makes recording impossible. Thus, the particles have to be sufficiently smaller than the recording wavelength.

Achieving higher recording density also requires increasing the resolving power of the recording signal, so it is also important to reduce magnetic recording medium noise. Since particle size is a major factor in noise, noise can be reduced by reducing the size of the particles. Accordingly, magnetic powder for high-density recording applications has to have a sufficiently small particle size to achieve the required noise reduction.

However, as the particles become smaller, it becomes more and more difficult for the particles to continue to exist as independent particles. Even in the case of the metal magnetic powder generally used in a data storage medium, extreme refinement of the particle size makes the powder susceptible to sintering during the reduction stage of the manufacturing process. Sintering is undesirable because it increases the volume of the particles, and the larger particles become a source of noise, in addition to which, when used to produce magnetic tape, they degrade dispersibility, surface smoothness and other properties. While a magnetic powder needs to have good magnetic properties to be suitable for a high-density recording medium, it also has to exhibit good powder properties during the tape manufacturing process, such as average particle diameter, particle size distribution, specific surface area, tap density, dispersibility and so forth.

JP 2000-277311 A (Reference No. 1) and WO 03/07933A1 (Reference No. 2) describe an iron nitride system magnetic powder whose main phase is $Fe_{16}N_2$ that has good magnetic properties that make it suitable for a high-density recording medium. Reference No. 1 discloses an iron nitride system magnetic material with a large specific surface area that exhibits a high coercive force (Hc) and high saturation magnetization ($\sigma s$), and teaches that good magnetic properties can be realized regardless of shape, due to a synergistic effect between the magnetic anisotropy of $Fe_{16}N_2$ phase crystals and enlargement of the specific surface area of the magnetic powder.

As an improvement on the magnetic powder of Reference No. 1, Reference No. 2 describes rare earth element—iron—boron system, rare earth element—iron system and rare earth element—iron nitride system magnetic powders composed of substantially spherical or ellipsoid particles, and teaches that a tape medium produced using such powders has good properties. In particular, it also states that despite being composed of fine particles having a size in the order of 20 nm, the rare earth element—iron nitride system magnetic powder whose main phase is $Fe_{16}N_2$ exhibits a high coercive force of 200 kA/m (2,512 Oe) or above, and a high saturation magnetization owing to its small BET specific surface area, and that use of this rare earth element—iron nitride system magnetic powder provides a major increase in the recording density of a coating type magnetic recording medium.

This rare earth element—iron nitride system magnetic powder is produced by an ammonia nitriding method in which rare earth element—iron system magnetic powder obtained by reducing magnetite particles having rare earth elements and one or two of Al or Si adhered to the particle surface is nitrided using $NH_3$ gas. The high crystal magnetic anisotropy of the $Fe_{16}N_2$ produced by the nitriding treatment makes it possible to obtain a magnetic powder suitable for a high recording density medium, that is, a magnetic powder characterized by high Hc, high $\sigma s$ and so forth.

OBJECT OF THE INVENTION

Now, more than ever, magnetic powder is required to have good weatherability that minimizes deterioration in the magnetic properties, even when the powder is used for an extended period of time. When computer storage tape is produced using magnetic powder that is susceptible to major aging of its properties, the Hc and $\sigma s$ decline with the passing of time. When the Hc declines, it becomes impossible to retain information recorded in the magnetic powder, so the information disappears. When the $\sigma s$ declines, the information recorded in the magnetic powder cannot be retrieved, and therefore is lost. Even if high-density recording is possible, loss of data is fatal for storage tape. As such, having good weatherability is of critical importance for a magnetic powder.

There is a major correlation between weatherability and average particle diameter, with the weatherability deteriorating as the average particle diameter decreases. So while finer particles are an important requirement for achieving higher-density recording, there is a tradeoff between finer particles and weatherability. Therefore, what is needed is a technology that can eliminate this tradeoff, allowing smaller particles to be used without sacrificing weatherability.

Also, the increase in specific surface area produced by particle size refinement gives rise to increased surface activity, making the powder susceptible to ignition when exposed to high temperatures. At the same time, therefore, there is also a strong need to develop technology that improves the high-temperature stability by raising the ignition temperature of the powder.

One way of increasing the recording density of a medium is to pack in as many magnetic particles as possible per unit area of the medium, for which it is necessary to improve the tap density of the powder. Even if particles are made finer, a low tap density will result in poor particle packing and no improvement in the recording density of the medium.

The object of the present invention is to provide fine iron nitride system magnetic powder having improved weatherability, high-temperature stability (hereinbelow both are collectively referred to as "storage stability") and tap density.

SUMMARY OF THE INVENTION

Based on detailed research, the present inventors found that iron nitride system magnetic powder having good storage stability could be achieved by using a starting material comprising iron nitride system magnetic powder that has been nitrided, using surface treatment to adhere one or more elements selected from Si, P and Ti to the surface of the powder particles, and providing the powder with a prescribed C content. This powder was also found to have an improved tap density.

Thus, the above object is attained by an iron nitride system magnetic powder comprising iron nitride system magnetic powder particles whose main phase is $Fe_{16}N_2$ (having an average particle diameter of not more than 25 nm, for example) to which one or more elements selected from Si, P and Ti is adhered, having a C/Fe atomic ratio of 0.5 to 30%, preferably a (Si+P+Ti)/Fe atomic ratio of 0.1 to 10%.

This C/Fe atomic ratio is the ratio between the C amount and Fe amount in the particles, expressed in atomic percent (at. %). Specifically, a value is used that is determined by using the C amount (at. %) and Fe amount (at. %) established by quantitative analysis of the particles, and the calculation 100×C amount (at. %)/Fe amount (at. %). Similarly, (Si+P+Ti)/Fe atomic ratio is the ratio between the total amount of Si, P, Ti and the Fe amount in the particles, expressed in atomic percent. Specifically, a value is used that is determined by using the amounts of Si, P, Ti (at. %) and the amount of Fe (at. %) established by quantitative analysis of the particles, and the calculation 100×(Si amount (at. %)+P amount (at. %)+Ti amount (at. %))/Fe amount (at. %).

This invention provides particles of the above iron nitride system magnetic powder to which one or more of Si, P, Ti is adhered, in which ΔHc as defined by Equation (1) is not more than 5%, or Δσs as defined by Equation (2) is not more than 20%.

$$\Delta Hc = 100 \times (Hc_0 - Hc_1)/Hc_0 \quad (1)$$

$$\Delta \sigma s = 100 \times (\sigma s_0 - \sigma s_1)/\sigma s_0 \quad (2)$$

Here, $Hc_0$ and $\sigma s_0$ are coercive force (kA/m) and saturation magnetization ($Am^2$/kg), respectively, of the iron nitride system magnetic powder after adhesion; and $Hc_1$ and $\sigma s_1$ are coercive force (kA/m) and saturation magnetization ($Am^2$/kg), respectively, of the iron nitride system magnetic powder after adhesion following storage of the powder in a thermo-hygrostat for one week (168 hours) at a temperature of 60° C. and a 90% relative humidity (RH). For this storage, 2 grams of the powder may be placed in a glass container to form a uniform thickness of 2 to 4 mm, placing the container in the thermo-hygrostat and maintaining it at 60° C. and 90% RH.

A suitable iron nitride system magnetic powder is one that has an ignition temperature of 140° C. or higher, and/or a tap density of at least 1.0 $g/cm^3$. The ignition temperature is the temperature at which, for example, 75 mg of the powder placed in the atmosphere ignites when heated from normal temperature at a temperature elevation rate of 10° C./min.

This invention provides iron nitride system magnetic powder having a refined average particle diameter of not more than 25 nm, or not more than 20 nm, having notably improved magnetic aging properties when used over an extended period of time and an elevated ignition temperature, that is, having good storage stability. The powder also has an improved tap density. Accordingly, the invention improves the performance, durability and reliability of a high recording density magnetic recording medium and electronic equipment in which the medium is used.

DETAILED DESCRIPTION OF THE INVENTION

The iron nitride system magnetic powder particles according to the present invention is adhered by a substance (such as an oxide, for example) containing one or more selected from Si, P and Ti to the surface of the particles, at the stage after the powder has been nitrided. The powder contains carbon. At this point, it is not clear whether this powder, refined to an average particle diameter of not more than 25 nm, or not more than 20 nm, exhibits a marked improvement in storage stability and an improved tap density. However, as shown in the examples described below, the iron nitride system magnetic powder of this invention to which one or more of Si, P and Ti are adhered following the nitriding treatment exhibits far better weatherability than conventional iron nitride system magnetic powder manufactured by a method in which Si or the like is adhered to the particles before the nitriding treatment, particularly when the particle diameter is not more than 25 nm. Also, the powder particles of this invention having a prescribed C content have a higher ignition temperature and tap density than powder particles to which Si or the like is adhered after nitriding but which do not have added carbon. From this, it is clear that the powder according to the present invention has a structure that differs from that of the conventional powders.

Accelerated tests confirmed that the good weatherability of the powder was maintained in the thermo-hygrostat. Specifically, this could be established by running an accelerated test on the powder held in the thermo-hygrostat for one week at 60° C. and 90% RH, then measuring post-test coercive force $Hc_1$ and saturation magnetization $\sigma s_1$ and comparing the measured values to the pre-test coercive force $Hc_0$ and saturation magnetization $\sigma s_0$. The ΔHc defined by Equation (1) and the Δσs defined by Equation (2) were investigated. The powder of the invention had a ΔHc no higher than 5% and a Δσs no higher than 20%, showing that the powder has good weatherability.

The ignition temperature of the powder can also be confirmed by accelerated testing, using a Thermogravimetric/Differential Thermal Analysis (TG/DTA) system. This is done by, for example, placing 75 mg of the powder in the TG/DTA system and elevating the temperature in the atmosphere from normal temperature at an elevation rate of 10° C./min until ignition takes place. The powder of this invention exhibited good high-temperature stability, having a high ignition temperature of 140° C. or above.

The method of obtaining the iron nitride system magnetic powder having improved storage stability and tap density according to the present invention, is described below.

Starting Material

While there is no particular limitation on the starting material constituted by the iron nitride system magnetic powder to which a material is to be adhered, it should prevent sintering and have a good particle size distribution and dispersibility for superior homogeneity during the adhesion process. An example of a suitable powder is the iron nitride system magnetic powder disclosed by the present applicant in Japanese Patent Application No. 2004-76080. That iron nitride system magnetic powder comprised primarily of $Fe_{16}N_2$ can be produced by reducing iron oxyhydroxide (goethite) containing Al in solid solution and then nitriding the reduced powder in a gas containing $NH_3$. The starting material does not have to contain C. A prescribed C content can be added by the treatment described below.

For use in a high recording density magnetic recording medium, it is preferable that the powder particles of the starting material have an average particle diameter of not more than 25 nm, more preferably not more than 20 nm. Using particles thus refined in accordance with this invention provides a pronounced improvement in storage stability.

Adhesion of Si, P, Ti

One or more of Si, P and Ti can be adhered by a surface treatment method comprising dispersing the iron nitride magnetic powder of the starting material in water, adding a pH adjuster, and then adding a substance containing the material to be adhered (Si, P, Ti). Alternatively, the powder can be dispersed in water and the substance containing the material to be adhered then added, followed by the addition of a pH adjuster. It is desirable to agitate the liquid when adding the substance containing the material to be adhered and when adding the pH adjuster. An aging time the agitated liquid is stored may be provided. The amount of Si, P or Ti that adheres can be controlled by adjusting the aging time.

Acids such as sulfuric acid, hydrochloric acid and acetic acid, and alkalis such as NaOH and $NH_3$ can be used as the pH adjuster. The pH adjuster should be added in an amount adjusted to produce a pH of 9 to 12 when a substance containing Si, P and Ti is added. If a method is used in which the pH adjuster is added first, it has to be adjusted to moderate the extent to which the magnetic powder would not be dissolved by the addition of a large amount of acid.

Si-containing substances that may be used include sodium silicate, silicon alkoxide, colloidal silica and silane coupling agents. P-containing substances that may be used include phosphoric acid, phosphate, phenyl phosphonic acid and hypo-phosphoric acid. Ti-containing substances that may be used include titanium chloride, titanium sulphate and titanium coupling agents. When a silane coupling agent or titanium coupling agent is used, C is added at the same time the Si or Ti is adhered, so the ignition temperature can be raised and the tap density improved without using the C-adding treatment described below.

Preferably, the M/Fe atomic ratio (where M is the total Si, P and Ti content) should be 0.1% or more. If the M/Fe atomic ratio is less than 0.1%, it may not be possible to consistently obtain a sufficient weatherability improvement effect. There is no particular upper limit to the M/Fe atomic ratio, as long as it is within a range within which the resulting powder does not become non-magnetic. For example, an upper limit of 50% may be used. In practice, an M/Fe atomic ratio in the range 0.1 to 10% provides quite a strong improvement in weatherability. Further improvement can be achieved by following the element adhesion with heat treatment at 80 to 200° C.

C Content

After one or more of Si, P and Ti has been adhered to the surface of the iron nitride system magnetic powder particles, the magnetic powder is washed in an organic solvent and C is added to the powder. This raises its ignition temperature and tap density. Alcohol can be used as the organic solvent. Alcohols that can be used include methanol, ethanol, 1-propanol, 2-propanol, 1-butanol, 2-butanol and the like, but the invention is not limited to these. Here, washing means putting the magnetic powder into the organic solvent and applying energy in some form, such as by using agitation, an ultrasonic homogenizer or a sand-grinder or the like. It does not mean that water adhering to the surface of the particles is replaced by alcohol or the like. It has yet to be clearly established that using an energy-imparting washing method brings about an increase in the ignition temperature and tap density, but it is surmised that the way the C is contained when energized washing is used differs from the way the C is contained when the surface water is simply replaced by alcohol. While it depends on the agitation rate or the amount of energy produced by the ultrasonic homogenizer or the like, the washing should be done for at least ten minutes.

A C content should be used whereby the C/Fe atomic ratio is from 0.5 to 30%. If the C/Fe atomic ratio is less than 0.5%, it may not be possible to consistently obtain a sufficient ignition temperature improvement effect. There is no particular upper limit to the C/Fe atomic ratio, as long as it is within a range within which the resulting powder does not become non-magnetic. Up to 30% is sufficient. In practice, a C/Fe atomic ratio in the range 0.5 to 20% provides quite a pronounced improvement in ignition temperature. As described in the above, C is also added when a silane coupling agent or titanium coupling agent is used, eliminating the need for a separate step for adding the C.

Before moving on to the examples of the invention, the methods used to measure the properties obtained in the examples will be explained.

Composition Analysis

The amount of Fe in the magnetic powder was determined using a COMTIME-980 Hiranuma Automatic Titrator manufactured by Hiranuma Sangyo Co., Ltd. The amounts of P and Ti were determined using an Iris/AP Inductively Coupled Plasma Spectrometer manufactured by Jarrell Ash Japan. The amount of Si in the magnetic powder was determined using the gravimetric method described by JIS M8214. The amount of C was determined using an EMIA 220V series carbon/sulfur analyzer manufactured by Horiba Ltd. These determinations were in weight percentages, which were converted to the atomic percentages of the elements, from which the Si/Fe, Ti/Fe, P/Fe and C/Fe atomic ratios were calculated.

Evaluation of Bulk Powder Properties

Average particle diameter: A model 100 CX Mark II transmission electron microscope manufactured by Nihon Denshi Corporation was used to take a transmission electron micrograph at a ×58,000 magnification, the micrograph was magnified to three times the size, and the longest portion of each of 400 magnetic particles shown therein was measured to obtain the average diameter.

Measurement of magnetic properties (coercive force Hc, saturation magnetization σs, and remanent magnetization σr): A vibrating sample magnetometer (VSM) manufactured by Digital Management Systems Corp. was used to perform the measurements in a maximum externally applied magnetic field of 796 kA/m.

Specific surface area: Measured by the BET method.

Ignition temperature: A TG/DTA 6300 Exstar 6000 manufactured by Seiko Instruments Inc. was used to measure the temperature at which the powder ignited when heated in the atmosphere at a temperature elevation rate of 10° C./min.

Tap density: This was measured by inserting the magnetic powder into a glass sample cell having a diameter of 5 mm and a height of 40 mm, and tapping it 200 times, using a tap height of 10 cm.

Evaluation of Weatherability

This was evaluated using an accelerated test of the magnetic aging properties of the powders. Specifically, the method described above with respect to bulk properties was used to measure the $Hc_0$ and $\sigma s_0$ prior to the acceleration test. Then, after storing the powder in a thermo-hygrostat for one week at 60° C. and 90% RH, the aforementioned method was used to measure the Hc and σs of the powders, and the measured values used as $Hc_1$ and $\sigma s_1$. Then, ΔHc and Δσs were obtained using the above Equations (1) and (2), and used to evaluate the weatherability. A smaller ΔHc and Δσs indicates better weatherability.

EXAMPLE 1

The iron nitride A shown in Table 1 was used as the iron nitride system powder of starting material. X-ray diffraction revealed that the iron nitride A was comprised primarily of $Fe_{16}N_2$, and had an oxide layer considered to be $\gamma$-$Fe_2O_3$.

972.3 milliliters of pure water was heated to 30° C., 10.4 grams of aqueous ammonia (having an $NH_3$ concentration of 23.1 mass percent) was added to the water, and 10 grams of the iron nitride A was stirred into the solution. Next, 17.2 grams of an aqueous solution of sodium silicate having a Si concentration of 2 mass percent was added and the solution stirred for 10 minutes. The slurry was then filtered through a biphenyl funnel to obtain cake that was then washed by using 1 liter of pure water. Next, the powder thus obtained was added to 400 milliliters of 2-propanol and stirred at 630 rpm for 15 minutes. The slurry obtained was filtered, and the powder thus obtained was dried in a nitrogen atmosphere at 80° C. for 6 hours or more, to obtain the desired C-containing, Si-adhered iron nitride system powder. An analysis of the composition showed that in terms of the Si/Fe atomic ratio, the powder had a Si content of 3.0%; and in terms of the C/Fe atomic ratio, the powder had a C content of 1.5%. The properties of the iron nitride system powder are listed in Table 2.

EXAMPLE 2

The same procedure as that of Example 1 was repeated, except that 2-butanol was used as the alcohol-based washing agent. An analysis of the composition showed that in terms of the Si/Fe atomic ratio, the powder had a Si content of 2.9%; and in terms of the C/Fe atomic ratio, the powder had a C content of 1.9%. The properties of the iron nitride system powder are listed in Table 2.

EXAMPLE 3

The same procedure as that of Example 1 was repeated, except that an ultrasonic homogenizer was used for the stirring. An analysis of the composition showed that in terms of the Si/Fe atomic ratio, the powder had a Si content of 3.0%; and in terms of the C/Fe atomic ratio, the powder had a C content of 1.2%. The properties of the iron nitride system powder are listed in Table 2.

EXAMPLE 4

972.3 milliliters of pure water was heated to 30° C., 11.3 grams of aqueous ammonia (having an $NH_3$ concentration of 23.1 mass percent) was added to the water, and 10 grams of the iron nitride A was stirred into the solution. Next, 28.5 grams of an aqueous solution of phosphoric acid with a P concentration of 2 mass percent was added and the solution stirred for 10 minutes. Following this, the same procedure as in the case of Example 1 was used to obtain the desired C-containing, P-adhered iron nitride system powder. An analysis of the composition showed that in terms of the P/Fe atomic ratio, the powder had a P content of 1.4%; and in terms of the C/Fe atomic ratio, the powder had a C content of 0.9%. The properties of the iron nitride system powder are listed in Table 2.

EXAMPLE 5

931.2 milliliters of pure water was heated to 30° C., 19.5 grams of aqueous ammonia (having an $NH_3$ concentration of 23.1 mass percent) was added to the water. Then, 10 grams of the iron nitride A was stirred into the solution, followed by the addition of 47.1 grams of an aqueous solution of titanium sulphate with a Ti concentration of 1.8 mass percent, and the solution was stirred for 10 minutes. Following this, the same procedure as in the case of Example 1 was used to obtain the desired C-containing, Ti-adhered iron nitride system powder. An analysis of the composition showed that in terms of the Ti/Fe atomic ratio, the powder had a Ti content of 3.7%; and in terms of the C/Fe atomic ratio, the powder had a C content of 1.2%. The properties of the iron nitride system powder are listed in Table 2.

EXAMPLE 6

679 grams of 2-propanol was put into a one-liter beaker having a lid with a good seal and stirred while blowing nitrogen gas into the solution at a flow rate of 1 l/min to purge dissolved oxygen and produce gaseous-phase in the space in the upper part of the beaker having a concentration of up to 0.1% oxygen. The blowing-in of the nitrogen gas and the stirring were continued until the completion of the reaction.

6 grams of the iron nitride A shown in Table 1 was then introduced into the beaker without coming into contact with the air, and was stirred for 10 minutes. Part of the liquid was then continuously extracted from the beaker, passed through a circulating sand-grinder and returned to the beaker, forming a continuous dispersion treatment that was continued for 60 minutes, producing a slurry. The interior of the sand-grinder was charged with zirconia beads 0.1 μm in diameter with a filling factor of 85%. The beaker was stirred at 630 rpm.

A 3-mass-percent concentration of a silane coupling agent (γ-methacryloxy-propyl-trimethoxy silane) is then added to the slurry in an amount that brings the Si/Fe atomic ratio of the magnetic powder to 2%, and the above dispersion treatment is continued for further 60 minutes. Then, 6.3 grams of pure water is introduced, effecting aging for 120 minutes as the hydrolytic reaction proceeds. The dispersion by the stirring and liquid circulation continues to be conducted during this hydrolysis and aging.

The slurry thus obtained was filtered through a Teflon membrane filter to obtain cake that was then washed by using 1 liter of 2-propanol. Next, the powder thus obtained was dried in a nitrogen atmosphere at 80° C. for 6 hours or more, to obtain the desired C-containing, Si-adhered iron nitride system powder. An analysis of the composition showed that in terms of the Si/Fe atomic ratio, the powder had a Si content of 1.5%; and in terms of the C/Fe atomic ratio, the powder had a C content of 13.3%. The properties of the iron nitride system powder are listed in Table 2.

EXAMPLE 7

The procedure used in Example 6 was repeated, except that an ultrasonic homogenizer was used for the dispersion treatment. An analysis of the composition of the C-containing, Si-adhered iron nitride system powder resulting from the coupling process showed that in terms of the Si/Fe atomic ratio, the powder had a Si content of 2.0%; and in terms of the C/Fe atomic ratio, the powder had a C content of 18.2%. The properties of the iron nitride system powder are listed in Table 2.

EXAMPLE 8

The procedure used in Example 7 was repeated, except that the coupling agent used was changed to the titanium coupling agent Plenact produced by Ajinomoto Fine-Techno Co., Ltd., and the change to an amount required to bring the Ti/Fe atomic ratio of the magnetic powder to 2%. An analysis of the composition of the C-containing, Ti-adhered iron nitride system powder resulting from the coupling process showed that in terms of the Ti/Fe atomic ratio, the powder had a Ti content of 2.0%; and in terms of the C/Fe atomic ratio, the powder had a C content of 16.0%. The properties of the iron nitride system powder are listed in Table 2.

EXAMPLE 9

The procedure used in Example 7 was repeated, except that the coupling agent used was changed to two types of a 3-mass-percent concentration of a silane coupling agent (γ-methacryloxy-propyl-trimethoxy silane) and Plenact titanium coupling agents produced by Ajinomoto Fine-Techno Co., Ltd., and the change to an amount required to bring the Si/Fe atomic ratio of the magnetic powder to 1% and the Ti/Fe atomic ratio to 1%, that is to bring (Si+Ti)/Fe atomic ratio of the magnetic powder to 2%. An analysis of the composition of the C-containing, Si+Ti-adhered iron nitride system powder resulting from the coupling process showed that in terms of the Si/Fe and Ti/Fe atomic ratios, the powder had a Si content of 1.2% and a Ti content of 1.0%, respectively, that is an Si+Ti content of 2.2%; and in terms of the C/Fe atomic ratio, the powder had a C content of 17.0%. The properties of the iron nitride system powder are listed in Table 2.

COMPARATIVE EXAMPLE 1

The procedure of Example 1 was repeated, without the step of washing with 2-propanol. An analysis of the composition of the Si-adhered iron nitride system powder thus obtained showed that in terms of the Si/Fe atomic ratio, the powder had a Si content of 3.2%; and in terms of the C/Fe atomic ratio, the powder had a C content of not more than 0.5%. The properties of the iron nitride system powder are listed in Table 2.

COMPARATIVE EXAMPLE 2

The procedure of Example 4 was repeated, without the step of washing with 2-propanol. An analysis of the composition of the P-adhered iron nitride system powder thus obtained showed that in terms of the P/Fe atomic ratio, the powder had a P content of 1.6%; and in terms of the C/Fe atomic ratio, the powder had a C content of not more than 0.5%. The properties of the iron nitride system powder are listed in Table 2.

COMPARATIVE EXAMPLE 3

The method described in Example 15 of Reference No. 2 was used, comprising adhering Si and Y to magnetite before nitriding, and then performing the nitriding treatment, to produce iron nitride system powder particles having an average diameter of 18 nm and a specific surface area of 56 $m^2/g$. In terms of the Si/Fe atomic ratio, the powder had an Si content of 4.3%. The properties of the iron nitride system powder are listed in Table 2.

TABLE 1

| Iron nitride sample | Adhering/ Washing Material | Adhesion method/ Alcohol washing method | Average Particle Diameter nm | BET nm | Tap g/cm³ | Hc kA/m | σs Am³/kg | σs/σr | ΔHc % | Δσs % | Ignition temperature C. | Si/Fe at. % | P/Fe at. % | Ti/Fe at. % | C/Fe at. % |
|---|---|---|---|---|---|---|---|---|---|---|---|---|---|---|---|
| A | N/A | N/A | 17 | 60 | 0.92 | 230 | 82 | 0.53 | 7.8 | 26.2 | 125 | <0.1 | <0.1 | <0.1 | <0.5 |

TABLE 2

| | Adhering/ Washing Material | Adhesion method/ Alcohol washing method | Average Particle Diameter nm | BET m²/g | Tap g/cm³ | Hc kA/m | σs Am³/kg | σs/σr | ΔHc % | Δσs % | Ignition temperature C. | Si/Fe at. % | P/Fe at. % | Ti/Fe at. % | C/Fe at. % |
|---|---|---|---|---|---|---|---|---|---|---|---|---|---|---|---|
| Example 1 | Sodium silicate | Stirring at 2-propanol 630 rpm | 17 | 59 | 1.10 | 217 | 81 | 0.51 | 4.9 | 11.9 | 145 | 3.0 | — | — | 1.5 |
| Example 2 | Sodium silicate | Stirring at 2-butanol 630 rpm | 17 | 59 | 1.04 | 215 | 80 | 0.50 | 4.8 | 12.5 | 149 | 2.9 | — | — | 1.9 |
| Example 3 | Sodium silicate | Ultrasonic 2-propanol homogenizer | 17 | 58 | 1.03 | 212 | 79 | 0.50 | 4.4 | 8.7 | 145 | 3.0 | — | — | 1.2 |
| Example 4 | Phosphoric acid | Stirring at 2-propanol 630 rpm | 17 | 54 | 1.05 | 210 | 78 | 0.50 | 4.0 | 15.5 | 152 | — | 1.4 | — | 0.9 |
| Example 5 | Titanium sulfate | Stirring at 2-propanol 630 rpm | 17 | 59 | 1.09 | 225 | 81 | 0.52 | 5.0 | 17.4 | 142 | — | — | 3.7 | 1.2 |
| Example 6 | Silane coupler | Sand-grinder | 17 | 51 | 1.24 | 222 | 78 | 0.52 | 4.3 | 12.8 | 149 | 1.5 | — | — | 13.3 |
| Example 7 | Silane coupler | Ultrasonic homogenizer | 17 | 50 | 1.22 | 226 | 78 | 0.52 | 4.4 | 13.4 | 145 | 2.0 | — | — | 18.2 |
| Example 8 | Titanium coupler | Ultrasonic homogenizer | 17 | 52 | 1.20 | 205 | 74 | 0.49 | 3.2 | 6.9 | 150 | — | — | 2.0 | 16.0 |
| Example 9 | Silane coupler Titanium coupler | Ultrasonic homogenizer | 17 | 50 | 1.25 | 220 | 76 | 0.50 | 3.3 | 7.1 | 150 | 1.2 | — | 1.0 | 17.0 |
| Comparative Example 1 | Sodium silicate | Stirring at 630 rpm | 17 | 58 | 0.94 | 226 | 78 | 0.52 | 3.5 | 12.3 | 127 | 3.2 | — | — | <0.5 |
| Comparative Example 2 | Phosphoric acid | Stirring at 630 rpm | 18 | 55 | 0.96 | 224 | 77 | 0.51 | 4.8 | 17.4 | 130 | — | 1.6 | — | <0.5 |

TABLE 2-continued

| | Adhering/ Washing Material | Adhesion method/ Alcohol washing method | Average Particle Diameter nm | BET m²/g | Tap g/cm³ | Hc kA/m | σs Am³/kg | σs/σr | ΔHc % | Δσs % | Ignition temperature C. | Si/Fe at. % | P/Fe at. % | Ti/Fe at. % | C/Fe at. % |
|---|---|---|---|---|---|---|---|---|---|---|---|---|---|---|---|
| Comparative Example 3 | — | — | 56 | | | 153 | 61 | 0.50 | 13.7 | 41.0 | — | 4.3 | — | — | <0.5 |

Results of Storage Stability Test

As can be seen from Table 2, the ΔHc and Δσs of the C-containing iron nitride system magnetic powder to which Si, P or Ti was adhered, as described in Examples 1 to 9, were vastly improved compared to the iron nitride A (Table 1) prior to the surface treatment. Along with this, the ignition temperature was elevated to 140° C. or above, and the tap density was increased to at least 1.0 g/cm³. In the case of the Comparative Examples 1 and 2 in which Si, P or Ti was adhered but there was no added C, there was not enough improvement in ignition temperature and tap density. In the case of the iron nitride system magnetic powder of Comparative Example 3 produced by a conventional method in which Si is adhered prior to the nitriding treatment, there is insufficient improvement in the ΔHc and Δσs, degrading the weatherability of the powder.

What is claimed is:

1. Iron nitride system magnetic powder comprising of particles comprised primarily of $Fe_{16}N_2$ to which is adhered one or more of Si, P and Ti, wherein an amount of the one or more of Si, P, and Ti is such that a (Si+P+Ti)/Fe atomic ratio is from 0.1 to 10%, and wherein the particle contains C in an amount such that a C/Fe ratio is from 0.5 to 30% 0.5 to 30%.

2. Iron nitride system magnetic powder comprising of particles having an average particle diameter of up to 25 nm comprised primarily of $Fe_{16}N_2$ to which is adhered one or more of Si, P and Ti, wherein an amount of the one or more of Si, P, and Ti is such that a (Si+P+Ti)/Fe atomic ratio is from 0.1 to 10%, and wherein the particle contains C in an amount such that a C/Fe ratio is from 0.5 to 30%.

3. An iron nitride system magnetic powder according to claim 1, in which ΔHc as defined by Equation (1) below is not more than 5%, $$\Delta Hc = 100 \times (Hc_0 - Hc_1)/Hc_0 \tag{1}$$

here $Hc_0$ is coercive force (kA/m) of the iron nitride system magnetic powder after adhesion, and $Hc_1$ is coercive force (kA/m) of the iron nitride system magnetic powder after adhesion following storage of the powder in a thermo-hygrostat for one week at a temperature of 60° C. and a relative humidity of 90%.

4. An iron nitride system magnetic powder according to claim 1, in which Δσs as defined by Equation (2) below is not more than 20%, $$\Delta \sigma s = 100 \times (\sigma s_0 - \sigma s_1)/\sigma s_0 \tag{2}$$

here $\sigma s_0$ is saturation magnetization (Am²/kg) of the iron nitride system magnetic powder after adhesion; and $\sigma s_1$ is saturation magnetization (Am²/kg) of the iron nitride system magnetic powder after adhesion following storage of the powder in a thermo-hygrostat for one week at a temperature of 60° C. and a relative humidity of 90%.

5. An iron nitride system magnetic powder according to claim 1 having an ignition temperature of 140° C. or above.

6. An iron nitride system magnetic powder according to claim 1 having a tap density of 1.0 g/cm³ or above.

7. An iron nitride system magnetic powder according to claim 2, in which ΔHc as defined by Equation (1) below is not more than 5%, $$\Delta Hc = 100 \times (Hc_0 - Hc_1)/Hc_0 \tag{1}$$

here $Hc_0$ is coercive force (kA/m) of the iron nitride powder after adhesion, and $Hc_1$ is coercive force (kA/m) of the iron nitride system magnetic powder after adhesion following storage of the powder in a thermo-hygrostat for one week at a temperature of 60° C. and a relative humidity of 90%.

8. An iron nitride system magnetic powder according to claim 2, in which Δσs as defined by Equation (2) below is not more than 20%, $$\Delta \sigma s = 100 \times (\sigma s_0 - \sigma s_1)/\sigma s_0 \tag{2}$$

here $\sigma s_0$ is saturation magnetization (Am²/kg) of the iron nitride system magnetic powder after adhesion; and $\sigma s_1$ is saturation magnetization (Am²/kg) of the iron nitride system magnetic powder after adhesion following storage of the powder in a thermo-hygrostat for one week at a temperature of 60° C. and a relative humidity of 90%.

9. An iron nitride system magnetic powder according to claim 2 having an ignition temperature of 140° C. or above.

10. An iron nitride system magnetic powder according to claim 2 having a tap density of 1.0 g/cm³ or above.

* * * * *